Patented Mar. 28, 1950

2,502,391

UNITED STATES PATENT OFFICE 2,502,391

STABILIZATION OF SYNTHETIC ELASTOMERS

Ernst P. Rittershausen, Hempstead, and Paul D. Sharpe, New York, N. Y., assignors to Socony-Vacuum Oil Company, Incorporated, a corporation of New York No Drawing. Application March 23, 1948, Serial No. 16,634

8 Claims. (Cl. 260—45.8)

The present invention has to do with stabilization of synthetic elastomers and, more particularly, has to do with the stabilization of butadiene-styrene elastomers and elastomeric compositions containing butadiene-styrene elastomers.

As is well known in the art, elastomeric compositions are somewhat unstable, particularly when in contact with oxidizing materials. For many years, therefore, natural rubber has been protected against oxidation by various materials which have been designated "antioxidants." With the development of a variety of synthetic rubbers or elastomers, there has again arisen the problem of preventing or retarding oxidation. Many of the antioxidants effective when used in small amounts of natural rubber, have been found to be effective also when so used with one or more synthetic elastomers. In a number of instances, however, antioxidants for natural rubber have proven to be ineffective when used with a synthetic elastomer. In a similar manner certain antioxidants having a high degree of effectiveness in protecting a particular synthetic elastomer have been of little value when used with natural rubber. Accordingly, it is well recognized that a catalytic action is involved in inhibiting oxidation of natural and synthetic elastomers.

It has now been found that certain polymeric materials, defined hereinafter, are particularly effective antioxidants when used in small amounts with butadiene-styrene copolymers known in the art as "GR-S" elastomers.

Butadiene-styrene copolymers are synthetic elastomers developed during the past decade, and have been identified in the art by the term "GR-S." They are described in "Specifications for Government Synthetic Rubbers," issued by Office of Rubber Reserve, and in numerous publications. As shown in the aforesaid "Specifications," "GR-S" elastomers are comprised of approximately 75 parts by weight of butadiene and 25 parts by weight of styrene. The copolymerization reaction is conducted by the emulsion polymerization process. In this process, monomers of butadiene and styrene are individually emulsified in water with the aid of soaps or similar materials. The monomer emulsions are combined and a polymerization catalyst such as potassium persulfate is added. Polymerization is conducted in a closed vessel for approximately 15 hours at about 105° F. To obtain a copolymer of desired properties, the polymerization reaction is stopped by the addition of a material such as hydroquinone. The unreacted monomers are removed by distillation, and the resulting latex is coagulated with an acid or salt solution. The precipitated "curds" of elastomer are then washed and dried.

In general, all "GR-S" elastomers are effectively stabilized by the polymeric materials contemplated herein. Particularly preferred, however, are "GR-S" materials of the character described on page 2 of the aforesaid "Specifications." Such materials are free of foreign or extraneous material objectionable in normal rubber practice, and have had incorporated during manufacture approximately 1.25% of a standard rubber antioxidant.

The polymeric materials referred to above are obtained by reacting thiophene, or substituted-thiophenes having stable electropositive substituents other than unstable hydroxyl (OH) and amino (NH₂) groups attached to the thiophene nucleus, with formaldehyde or its polymers, and with an ammonium halide or an amine salt. The preparation of these polymeric materials is described in co-pending application Serial No. 636,511, filed December 21, 1945, of Howard D. Hartough and Sigmund J. Lukasiewicz. As set forth in said co-pending application, the polymeric materials are amines and appear to be represented by the following general formula:

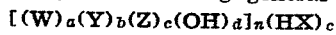

$$[(W)_a(Y)_b(Z)_c(OH)_d]_n(HX)_c$$

wherein:

W is one of the group, thiophene and thiophenes having stable electropositive groups attached to the nucleus;
Y is a methylene group;
Z is nitrogen;
(OH) is part of the molecule reacting with acetic anhydride as in the ASTM method for determining hydroxyl numbers;
HX is a hydrohalide;
$a$ is a small whole number, 1 to 4;
$b$ is a small whole number, 2 to 16;
$c$ is a small whole number, 1 to 4;
$d$ is a small whole number, 1 to 4;
$n$ is the number of units in the polymer.

The aforesaid polymeric amines are obtained by reacting thiophene, formaldehyde and an ammonium halide. As shown by Hartough and Lukasiewicz, the variation of proportions, or of the molar ratios, of the reactants results in a variation in molecular weight of the polymeric amines. By proper selection of proportions, polymeric amines having molecular weights of the order of 500 to 1500 (±10%) and greater can be obtained. Of such polymeric amines, we have found that those having molecular weights from about 850 to about 1500 (±10%) are effective stabilizers for "GR-S" elastomers. Particularly preferred of the effective polymeric amines, however, are those having a molecular weight of about 1000 to about 1250 (±10%) and the following characteristics:

Sulfur content, from about 22 to about 25;
Nitrogen content, from about 3 to about 6;
Hydroxyl number (ASTM), from about 200 to about 350.

The aforesaid effective polymeric amines are prepared by reaction of thiophene or substituted thiophene, formaldehyde or polymer thereof, and an ammonium halide, all as described hereinabove. The particularly preferred polymeric amines are prepared by reacting the aforesaid reactants in a ratio of 1:2:1.

As indicated hereinabove, the molecular weights are subject to experimental error of about ±10 per cent; an experimental error long recognized in the art. The hydroxyl number, referred to above, is determined by the ASTM method, and is indicative of the part of the molecule of the polymer reacting with acetic anhydride. Under the conditions of the ASTM test, groups other than the hydroxyl group react with acetic anhydride; a typical group is the imino group.

For a more complete understanding of the polymeric amines contemplated herein, the following illustrative example is set forth below. This example is shown as Example VII of the copending application identified above, and the polymeric amine obtained is the amine of said Example VII. Reference is made to said copending application for further description and representative examples.

EXAMPLE

A mixture of 168 grams (2 mols) of thiophene, 120 grams (4 mols) of paraformaldehyde, 108 grams (2 mols) of ammonium chloride and 20 grams of acetic acid were heated for 1½ hours at 74° C. The reaction product thus obtained was treated with a saturated aqueous solution of 200 grams of crystalline sodium acetate, and 300 milliliters of benzene. A liquid was separated from the resulting mixture. This liquid is predominantly comprised of the desired amine. It was treated with caustic solution and the amine freed therefrom was dissolved in benzene. Benzene was distilled off and the amine was analyzed. The amine had the following properties:

Sulfur, 23.1 per cent; nitrogen, 4.67 per cent; hydroxy number, 257; molecular weight, 1123.

The "GR-S" material used in obtaining data in Tables I and II, shown below, is of the character described on page 2 of the aforesaid "Specifications." The following are specification limits for the "GR-S" material:

Chemical:
- Volatile matter _____ 0.50% (max.)
- Ash _____ 1.50% (max.)
- E-T-A extract _____ 10.00% (max.)
- Fatty acid (as stearic acid) _____ 3.75% (min.) / 6.00% (max.)
- Soap (soluble as sodium stearate) _____ 0.75% (max.)

Physical:
- Viscosity of "GR-S" _____ 46 (min.)
  ML 212° F. at 4 mins _____ 54 (max.)
- Viscosity of compounded stock:
  ML 212° F. at 4 mins _____ 73 (max.)
- Properties of vulcanizate at 82° F.:
  Tensile strength, 50 min. cure at 292° F _____ 2700 p. s. i. (min.)
  Ultimate elongation, 50 min. cure at 292° F _____ 550% (min.)
- Modulus at 300% elongation:
  25 min. cure at 292° F _____ 350 p. s. i. (min.) / 650 p. s. i. (max.)
  50 min. cure at 292° F _____ 800 p. s. i. (min.) / 1200 p. s. i. (max.)
  90 min. cure at 292° F _____ 1150 p. s. i. (min.) / 1550 p. s. i. (max.)

The antioxidant or stabilizing characteristics of the polymeric amines described above are illustrated by the following test data with a typical basic gum stock formulation. The antioxidant properties of the polymeric amine obtained in the example above are compared with those of phenyl-beta-naphthylamine in the following formulation (Table I). As is well known in the art, phenyl-beta-naphthylamine is an effective rubber antioxidant.

Table I

| | Parts by weight | |
|---|---|---|
| "GR-S" | 100 | 100 |
| Stearic acid | 1 | 1 |
| Zinc oxide | 10 | 10 |
| Mercapto benzothiazole | 1 | 1 |
| Sulfur | 3 | 3 |
| Phenyl-beta-naphthylamine | -- | [1]1 |
| Polymeric amine (Example I) | [1]1 | -- |

[1] 0.86 weight per cent.

The formulations shown in Table I, above, were cured individually at 274° F. The effectiveness of the polymeric thiophene amine, and the superiority thereof over phenyl-beta-naphthylamine, are shown by tensile strength data in Table II below. The change in tensile strength of standard dumbbell test strips is determined by measuring the tensile strength before and after artificial aging, which simulates conditions normally encountered. Strips of the cured (or compounded) materials are artificially aged by exposing the same for 24 hours in a forced draft oven maintained at 121° C.

Table II

| Strips with Antioxidant | Cure (Mins.) | Before Aging | | After Aging | | Per Cent Change Tensile |
|---|---|---|---|---|---|---|
| | | Per Cent Elongation | Tensile Strength (p. s. i.) | Per Cent Elongation | Tensile Strength (p. s. i.) | |
| Phenyl-beta naphthylamine | 30 | 820 | 1,620 | 140 | 1,180 | −28 |
| | 45 | 500 | 1,600 | 150 | 1,320 | −18 |
| | 60 | 380 | 1,860 | 150 | 1,560 | −16 |
| | 90 | 250 | 1,340 | 120 | 1,320 | −2 |
| Polymeric Amine (Example I) | 30 | 280 | 2,200 | 110 | 1,330 | −40 |
| | 45 | 200 | 1,880 | 100 | 1,480 | −22 |
| | 60 | 190 | 1,830 | 100 | 1,870 | +2 |
| | 90 | 200 | 1,860 | 120 | 1,860 | 0 |

As those skilled in the art know, there is an optimum time of cure for each rubber or elastomer formulation, the optimum being based upon balance of elongation and tensile strength characteristics. The data in Table II, above, indicate that the optimum cure is between 45 and 60 minutes at 274° F. for the formulation containing a typical antioxidant, phenyl-beta-naphthylamine; whereas, the optimum cure period for the formulation containing the polymeric amine of Example I is about 60 minutes at 274° F. The data demonstrate that, at optimum cure, the latter formulation has practically the same tensile strength after aging as before aging. This is in contrast with the substantial loss in tensile strength, at optimum cure, of the formulation containing phenyl-beta-naphthylamine.

Elastomeric formulations, or basic gum stocks, as illustrated by those shown in Table I, above, generally contain other materials in addition to the elastomer and antioxidant. Typical of such materials are the following: lubricant, such as stearic acid and other fatty acids, soaps of fatty acids such as zinc stearate; an inorganic accelerator-activator such as zinc oxide, oxides of lead or magnesium, lead salts, lime, etc.; accelerators such as mercaptobenzothiazole, mercaptans, disulfides, etc.; vulcanizing agents such as sulfur, selenium or tellurium, or organic compositions containing one or more of said elements and from which is liberated one or more of said elements during curing. These materials are used in proportions such as shown in the formulations shown in Table I, above, and as usually found in "GR-S"—containing formulations.

The effective polymeric amines provide satisfactory results when used within the range of about 0.75 part by weight to about 2.00 parts by weight, for 100 parts by weight of "GR-S" elastomer.

It is to be understood that the invention is not limited by the foregoing description and illustrative examples, but is to be broadly construed in the light of the language of the appended claims.

We claim:

1. In a basic gum stock containing a butadiene-styrene elastomer, the improvement which comprises: incorporating therein a small amount, sufficient to stabilize said stock against oxidation, of a polymeric thiophene amine having a molecular weight between about 850 and about 1500.

2. A basic gum stock containing a butadiene-styrene elastomer and a small amount, sufficient to stabilize said elastomer against oxidation, of a polymeric thiophene amine having a molecular weight between about 850 and about 1500.

3. A stable elastomeric composition comprising a butadiene-styrene elastomer and a small amount of a polymeric thiophene amine having a molecular weight between about 850 and about 1500, from about 0.75 part by weight to about 2.00 parts by weight of said amine being present with 100 parts by weight of said elastomer.

4. A basic gum stock consisting essentially of:

| | Parts by weight |
|---|---|
| Butadiene-styrene elastomer | 100 |
| Stearic acid | 1 |
| Zinc oxide | 10 |
| Mercaptobenzothiazole | 1 |
| Sulfur | 3 |
| Polymeric thiophene amine | 1 | said polymeric thiophene amine containing at least one thiophene nucleus per polymer unit, having a molecular weight of about 1123, an hydroxyl number (ASTM) of 257, and containing about 23.1 per cent sulfur and about 4.67 per cent nitrogen.

5. The method of stabilizing a basic gum stock containing a butadiene-styrene elastomer, which comprises: incorporating in said stock a small amount, sufficient to stabilize said stock, of a polymeric thiophene amine having a molecular weight of about 850 to about 1500.

6. In a basic gum stock containing a butadiene-styrene elastomer comprising approximately 75 parts by weight of butadiene and 25 parts by weight of styrene, the improvement which comprises: incorporating therein a small amount, from about 0.75 part by weight to about 2.00 parts by weight for 100 parts by weight of said elastomer, of a polymeric thiophene amine having a molecular weight between about 1,000 and about 1,250.

7. In a basic gum stock containing a butadiene-styrene elastomer comprising approximately 75 parts by weight of butadiene and 25 parts by weight of styrene, the improvement which comprises: incorporating therein a small amount, from about 0.75 part by weight to about 2.00 parts by weight for 100 parts by weight of said elastomer, of a polymeric thiophene amine containing at least one thiophene nucleus per polymer unit, having a molecular weight of about 1123, an hydroxyl number (ASTM) of 257, and containing about 23.1 per cent sulfur and about 4.67 per cent nitrogen.

8. The method of stabilizing a basic gum stock containing a butadiene-styrene elastomer comprising approximately 75 parts by weight of butadiene and 25 parts by weight of styrene, which comprises: incorporating in said stock a small amount, from about 0.75 part by weight to about 2.00 parts by weight for 100 parts of said elastomer, of a polymeric thiophene amine having a molecular weight between about 1000 and about 1250.

ERNST P. RITTERSHAUSEN.
PAUL D. SHARPE.

No references cited.